United States Patent [19]

Raskin et al.

[11] Patent Number: 5,031,235
[45] Date of Patent: Jul. 9, 1991

[54] CABLE SYSTEM INCORPORATING HIGHLY LINEAR OPTICAL MODULATOR

[75] Inventors: Donald Raskin, Bronx, N.Y.; Kophu Chiang, Edison; James B. Stamatoff, Westfield, both of N.J.

[73] Assignee: Hoechst Celanese Corp., Somerville, N.J.

[21] Appl. No.: 429,266

[22] Filed: Oct. 27, 1989

[51] Int. Cl.⁵ .............................................. H04B 10/12
[52] U.S. Cl. ................................. 455/612; 340/96.15; 370/3; 455/617
[58] Field of Search ............... 455/611, 608, 609, 612, 455/613, 617, 618; 370/3; 350/96.13, 96.15, 96.16, 355

[56] References Cited

U.S. PATENT DOCUMENTS 4,860,279 8/1989 Falk ..................................... 455/617
4,893,300 1/1990 Carlin ..................................... 370/3

Primary Examiner—Reinhard J. Eisenzopf
Assistant Examiner—L. Van Beek
Attorney, Agent, or Firm—Anthony Handal

[57] ABSTRACT

A system incorporating a pair of Mach-Zehnder modulators (164,166) for performing amplitude modulation of an optical carrier is disclosed. Each of the modulators is designed to suppress even order distortion products and develop third order distortion products of opposite sign and equal magnitude. The outputs of the two modulators are combined in a directional coupler (155) resulting in substantially suppressing second through fourth order distortion products.

13 Claims, 3 Drawing Sheets

CABLE SYSTEM INCORPORATING HIGHLY LINEAR OPTICAL MODULATOR

TECHNICAL FIELD

The present invention relates to devices for modulating the intensity of light. It is particularly suitable for intensity modulation of relatively high power output lasers for the purpose of carrying amplitude modulated information in the hundreds of megahertz and higher in frequency. Applications include, by way of example, cable television distribution systems carrying information in the 50-650 Mhz range and potentially higher frequencies for increased system channel capacity, high resolution television or the like.

BACKGROUND

Prior to the development of optical communication systems, substantially all information transmission was accomplished through the use of electrical cable systems, radio frequency transmission and, more recently, point-to-point microwave links. For certain applications, cable systems represent the optimal solution, in view of their capacity to carry large numbers of channels and their immunity to interference, as well as because of the fact that they do not occupy the limited on-the-air radio frequency spectrum.

Thus, over the years, extensive cable systems carrying telephone calls, data, telex and television have been developed. With the increasing development of optical communication systems, many of these cable networks are being replaced and/or upgraded with optical fiber cable systems. Optical systems are particularly desirable in view of their ability to carry greater numbers of channels, their relatively low failure rates, and their ability to eliminate the need for large numbers of repeaters in cascade, which, in principle, should result in reduced distortion. Today, the primary use of such systems is in digital voice and data transmission systems.

Despite the above advantages, the application of fiber optic techniques presents several challenges to certain major end-users. While transmission over the fiber optic line is often vastly superior both in terms of span length between repeaters and the number of independent channels which may be carried by a single fiber, the generation of a highly linearly amplitude-modulated (AM) light signal presents substantial obstacles. These problems may be particularly serious where it is desired to integrate a fiber optic span into an existing cable system. If the existing system is a digital system, the quality of the modulation of the system is of relatively minor importance in view of the fact that such systems function well in relatively high noise and high distortion environments. Similarly, in the case of frequency modulated (FM) systems, the wide bandwidth of the signal, the redundancy of the sidebands and the resultant natural immunity of FM systems to noise again results in generally acceptable performance. However, in the case of high fidelity amplitude modulated systems, substantial problems are presented.

One particular application in which it is desired to maintain large parts of an existing network is in the cable television industry. Here, the large number of individual subscriber connections and extensive local area cables makes complete replacement of the system undesirable. Moreover, the large number of existing television sets and the necessity of the system to accommodate equipment marketed for off-the-air television reception necessitates that at least some portion of local signal distribution be in a conventional AM radio frequency format.

Despite the advantages, as yet, there has been little penetration of the cable television industry by fiber optic systems due to the difficulty of meeting minimum standards which the industry has proposed, despite substantial research efforts aimed at providing high quality optical amplitude modulation.

In the event that one wishes to put amplitude modulation onto a carrier, be it an optical carrier or otherwise, it is necessary to modulate the intensity of the carrier linearly in proportion to the information which one wishes to transmit. Generally, such linear modulation may be defined as multiplication by a constant scaling factor and/or the addition of a DC bias level. Such operations are linear, and any device which performs such operations will have an output with frequency components identical to its input frequency components. However, in the event that there are non-linearities in the system, the output will also include components which represent multiple sums and differences of the input frequency components.

In principle, there are a number of ways of obtaining a modulated laser light beam. In the case of semiconductor diode lasers, the most direct modulation method is to apply a constant electrical input current to bias the diode above its lasing threshold and then to add a variable current proportional to the desired information signal. If the light output were to vary linearly with the input current above threshold, then the optical signal would be a high-fidelity replica of the original information. Unfortunately for many end-uses, it is very rare to find a semiconductor laser that possesses a degree of linearity that is sufficient. As reported recently in the Proceedings of the 1989 Annual Meeting National Cable Television Association[1] the cost of these carefully selected lasers prohibits their widespread use at present.

[1] James A. Chiddix, "Fiber Backbone—Multi-Channel AM Video Trunking", pp 246-253, May 1989.

Other alternatives include modulating the intensity of a constant source, for example, through the use of a Kerr or Pockels cell. Unfortunately, such modulation techniques are inherently nonlinear and exhibit relatively good linearity only when the amplitude of the modulation is impractically small. Moreover, in the event of such relatively small dynamic range in modulation, other factors such as source and receiver noise and the like act to effectively overcome any gains in fidelity achieved as a result of using a very small part of the device characteristic, albeit relatively linear.

In a paper prepared for the Air Force Office of Scientific Research entitled Use of Predistortion to Reduce Intermodulation Distortion in Optical Fiber Communication Sources[2], Larson and Smith proposed compensating for the nonlinearity of a diode by predistorting the signal input to the light-emitting diode. In accordance with this technique, an optical receiver and a light-emitting diode transmitter are constructed to measure the intensity of light output by the light-emitting diode a against its input current.

[2] Report AFOSR-TR-79-0904 May 1979.

A polynomial describing the dynamic characteristic is then developed and used to predict the intermodulation distortion as a function of the percentage of modulation. A compensating network is then developed. Reduction of intermodulation distortion products in the range of 6-15 decibels has been noted using this technique. While such improvements certainly are significant, they do not nearly approach the degree of suppression necessary to achieve a high quality amplitude-modulated optical cable network.

Furthermore, such precompensation is possible only in cases where the non-linearities of the light emitting source are well-defined, predictable and non-varying. This is not generally the case for high power semiconductor devices.

A more effective approach was proposed in an article entitled Linear Interferometric Modulators in Ti: Li Nb $O_3$ by Bulmer and Burns in the Journal of Lightwave Technology, Volume LT-2, No. 4, of August, 1984. In accordance with this system, a Mach-Zehnder interferometric modulator with asymmetric arms is used to achieve greater linearity. Generally, the device described in this article comprised a two-armed device in which one of the arms is given a DC bias which results in an intrinsic phase bias between coherent light from a single source which exits the two arms, of approximately 90 degrees. While such an arrangement does have the effect of substantially suppressing second and fourth intermodulation distortion products, the substantially unaffected third order distortion products do not render the system adequate for high quality, relatively high power and high capacity optical cable information distribution systems.

In a paper entitled Reduction of Intermodulation Distortion in Interferometric Optical Modulators presented by Johnson and Roussell at the IEEE/LEOS Meeting, held at Santa Clara, Calif. in November of 1988, a dual polarization technique was proposed for reducing intermodulation distortion in waveguide interferometric modulators. Here, an interferometric modulator supporting single transverse electric and transverse magnetic modes was driven by a modulating signal. Because there is a three-fold difference in the voltage sensitivity between the TE and TM modes, an input light polarization angle could be found that would suppress selectively the dominant cubic term of intermodulation distortion.

However, such an approach suffers from additional problems such as the simultaneous processing of two different polarization components which would impose additional problems in manufacture and operation of the device. In addition, interference effects arising from interactions between scattered portions of the two polarization components within the optical fiber transmission line will give rise to unwanted intermodulation products and/or compression-expansion terms in the output TV signal.

SUMMARY OF THE INVENTION

In accordance with the present invention, a highly linear amplitude modulated optical carrier is provided by an integrated optical modulator. Highly linear amplitude modulated optical carriers are provided by a unit receiving two coherent light sources for modulation and comprising two interferometric electro-optic modulators and one optical combining means. In the preferred embodiment, the two modulators and the optical combiner are all constructed upon one planar substrate, using integrated optic waveguiding structures.

BRIEF DESCRIPTION OF THE DRAWINGS

One way of carrying out the invention is described in detail below with reference to drawings which illustrate only one specific embodiment of the invention and in which.

BEST MODE FOR CARRYING OUT THE INVENTION

Figure 1:
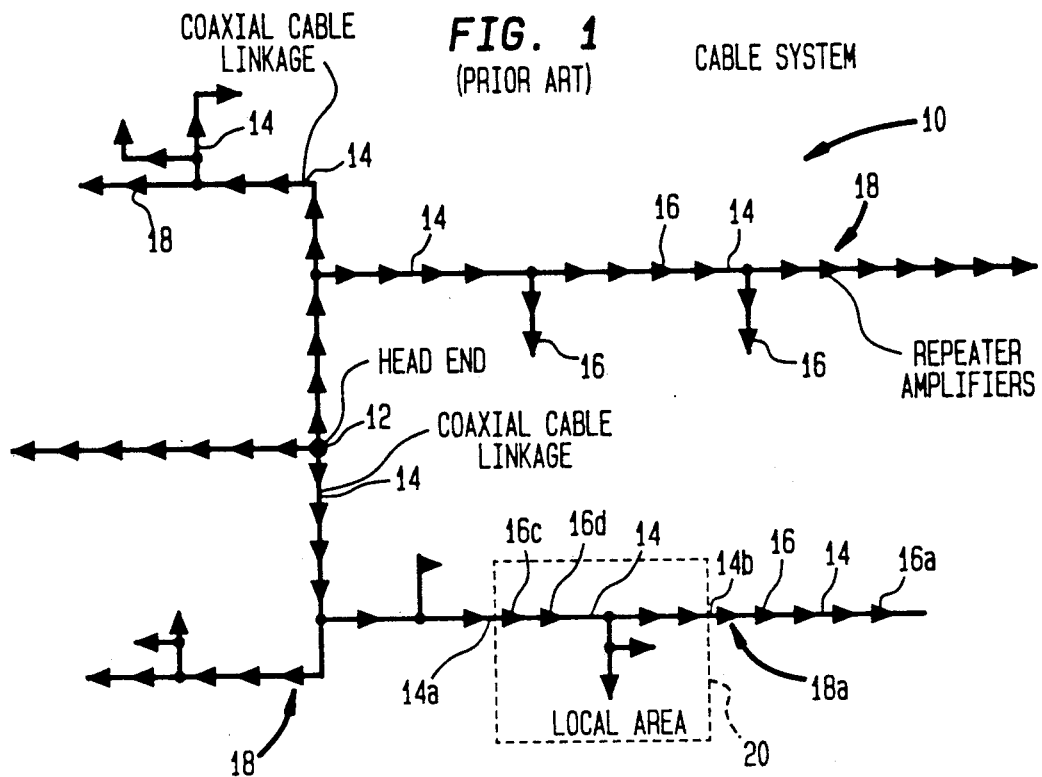
FIG. 1 is a diagrammatic representation of the layout of a conventional cable television system layout.

While the instant invention is susceptible of use in a wide variety of applications, for purposes of exposition, the same will be described in the particular context of one such application, namely, a television cable distribution system. Such a cable system 10 is illustrated in solid lines in FIG. 1. System 10 comprises a head end 12 from which distribution of information through system 10 originates. Distribution is done via numerous links 14 of coaxial cable which, together with strings or groups 16 of repeater amplifiers represented by single symbols form numerous legs 18. Legs 18 serve various local regions which, for purposes of analysis, may be broken down into local areas such as local area 20.

The problem with such systems is that the number of amplifications involved is relatively high resulting in increasing noise and distortion. As a practical matter, this limits either the extent or the signal quality of the distribution network.

We can achieve some idea of the problems by considering, for example, a subscriber who is wired to the output of a long repeater amplifier cascade, such as beyond amplifier group 16a. In particular, before receiving this signal, the signal output by head end 12 could be amplified by 40 or more cascaded amplifiers. Accordingly, the non-linearities of the amplifiers are compounded by each other forty times, resulting in significant degradation of the signal, unless the amplifiers are f the highest quality, in which case an acceptable degree of degradation in the signal quality will occur. Nevertheless, the signal output by repeaters closer to the head end is of better quality than signals at remote points from the head end. More serious are the problems that are caused by repeater failures early in the cascade chain. For example, if repeater group 16b were to fail, a major part of the cable system, including two legs and numerous local areas (in the particular example illustrated) will lose television service.

Figure 2:
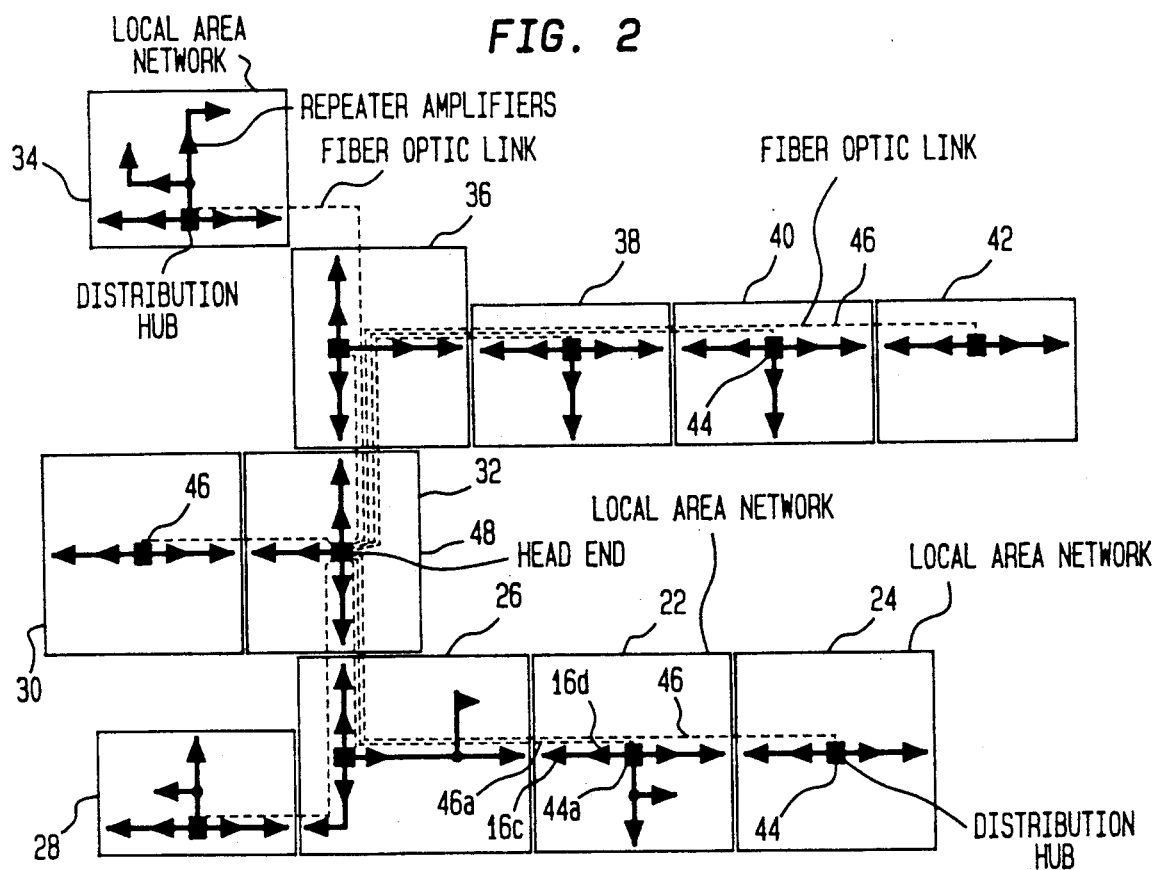
FIG. 2 is a diagrammatic representation of a cable television system incorporating an optical fiber in accordance with the present invention.

In accordance with the present invention, the cable system illustrated in FIG. 1 would, rather, take the form of the system illustrated in FIG. 2. Here, local area 20 would be served by a local area network 22 which would only be one of numerous other local area networks 24, 26, 28, 30, 32, 34, 36, 38, 40 and 42. Each of these local area networks has a distribution hub 44 with each of the distribution hubs being driven with an optical carrier bearing television signals via its respective optical fiber link 46. All optical fiber links are connected at one end to their associated distribution hub and at the other end to the optical cable system head end 48.

As can be seen from the directionality of the repeater amplifiers, conversion of an existing cable system from the prior art system of FIG. 1 to a system incorporating the inventive optical modulator and employing fiber optic links can be achieved by opening the connections between adjacent local areas resulting in electrically independent local area networks and then modifying the hardware within a given local area by reversing the directionality of some of the amplifiers, that is, by reversing their inputs with their outputs to achieve distribution from the newly installed distribution hub for the particular area network. For example, in the case of local area 20, the inventive local area network 22 includes a new distribution hub 44a and involves the use of otherwise pre-existing hardware and cables. However, repeater amplifiers 16c and 16d have had their inputs and outputs reversed in local area network 22. Likewise, links 14a and 14b have been opened, thus isolating local area network 22 from adjacent local area networks 24 and 26 allowing it to be fed by optical fiber link 46a. Other variants on this network design for cable television exist, but all depend on high-quality fiber-optic links such as 46 to bring undistorted amplitude-modulated signals from the head end to the neighborhood distribution hub.

While, as was discussed above, the network of FIG. 2, incorporating as it does optical fiber links, would appear to have a number of important advantages. Nevertheless, significant problems would be introduced by the same if an exceptionally high quality optical modulation is not achieved. However, as was noted earlier, significant amounts of non-linear distortion and/or other drawbacks are present in prior art systems. In contrast, in accordance with the present invention, a means is provided by which the signal may be modulated onto an optical carrier while substantially suppressing second, third and fourth order distortion products.

Figure 3:
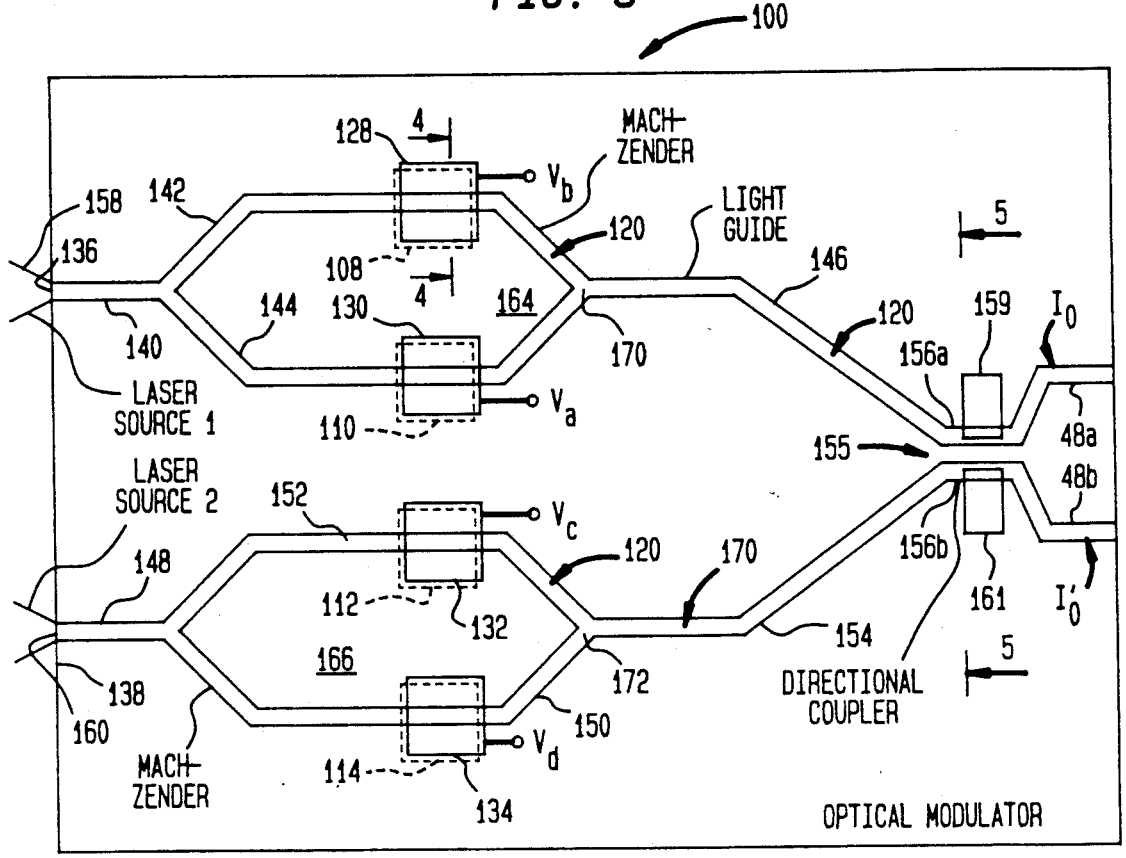
FIG. 3 is a diagrammatic representation of an integrated-optic linear modulator for use in the system of FIG. 2 in accordance with the present invention.
Figure 4:
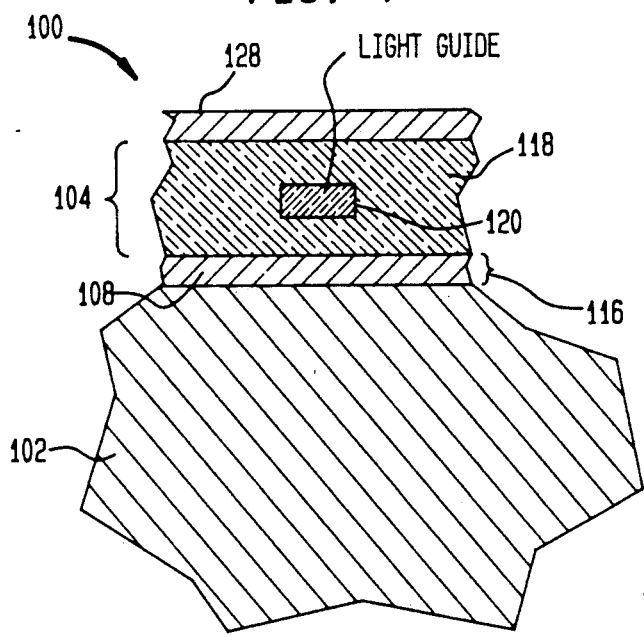
FIG. 4 is a cross-sectional view of the active modulation portion of the modulator along lines 4—4 of FIG. 3.

The inventive system is shown schematically in FIGS. 3 and 4 using organic electro-optic materials, simply for purposes of illustration. The integrated-optic unit shown schematically in FIG. 3 can also be constructed using conventional technology in lithium niobate, as described generally by Voges and Neyer[3] and the references cited therein or other crystalline electro-optic materials. Of course, the invention may be implemented with Mach-Zehnder lithium niobate modulators of the type disclosed in U.S. Pat. No. 4,266,850 of Burns entitled Integrated Bias for Waveguide Amplitude Modulator Alternatively, it can be constructed within electro-optic polymeric films, as described by Haas, Lee, Man and Mechensky[4] and the references cited therein.

[3] E Voges, A. Neyer, "Integrated-Optic Devices on LiNbO₃ for Optical Communication", "*Journal of Lightwave Technology*", vol. LT-5, pp 1229-1238, September 1987.

[4] D. Haas, C. Lee, H-T. Man, V. Mechensky, "Nonlinear Organic Polymers", *Photonics Spectra*, Vol. 23, No. 4, pp 169-174, April 1989.

Referring to FIGS. 3 and 4, generally, the inventive complex modulator 100 comprises a substrate 102. An integrated optical circuit 104 is disposed over the top surface of substrate 102.

A plurality of interconnected base electrodes 108, 110, 112 and 114 are disposed substantially in the positions illustrated in the schematic diagram of FIG. 3. These electrodes are, typically, made of gold and have a thickness 116 of 0.1 to 4 microns.

Figure 5:
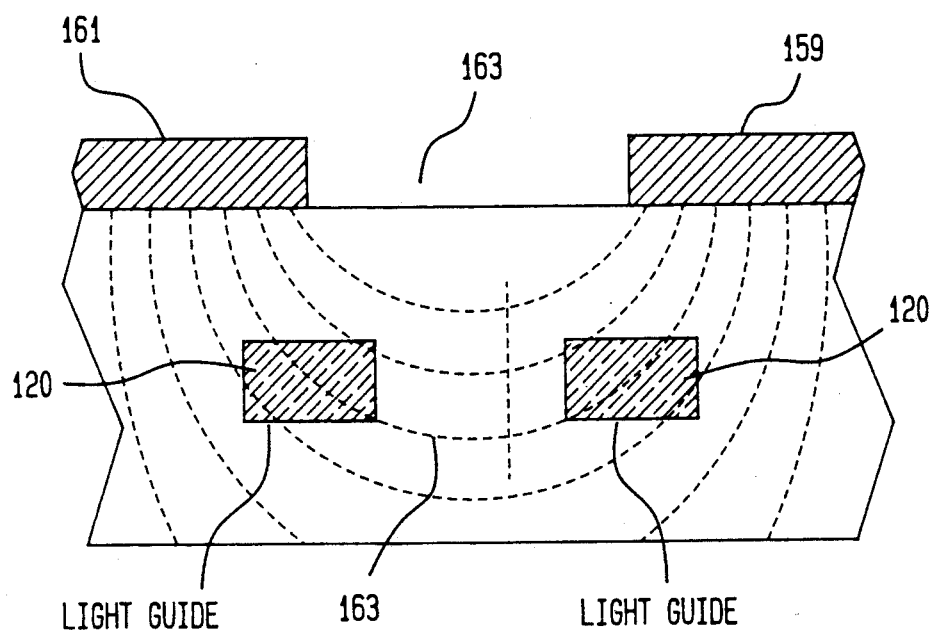
FIG. 5 is a cross-sectional view along lines 5—5 of FIG. 3, illustrating a directional coupler useful in the inventive system.

A cladding region 118, is disposed around a light conducting region or member 120. In accordance with the preferred embodiment, light conducting member 120 may be made of the newly developed organic electro-optic polymers or, of course, more conventional materials such as titanium-indiffused lithium niobate. The optical refractive index of the light conducting member 120 is greater than that of the cladding region 118. Organic electro-optic materials suitable for implementation in the invention and the use of such materials are discussed in U.S. Pat. No. 4,766,171 of De Martino, entitled Organic Nonlinear Optical Substrate and U.S. Pat. No. 4,822,865 of De Martino et al entitled Acrylic Copolymers Exhibiting Nonlinear Optical Response, the disclosures of which are incorporated herein by reference. Returning to FIG. 3, the inventive structure is completed by six outer electrodes 128, 130, 132, and 134, which overlie base electrodes 108, 110, 112 and 114, respectively, and a directional coupler structure (FIG. 5).

It is noted that in the schematic diagram of FIG. 3, for purposes of illustration, the electrodes are illustrated somewhat offset from each other. In actual construction, however, the perspective illustrated in FIG. 3 would not be seen in a planar view, as the electrodes substantially overlie each other. Of course, such overlying construction, as illustrated in FIG. 4, is not necessary as long as the electrodes define between them a space which substantially covers the active light-conducting regions of light conducting member 120.

As can be seen in FIG. 3, the integrated optical modulator 100 generally defines a first optical input 136 and a second optical input 138 which receive coherent light waves to be modulated. First optical input 136 serves as a coupling to input link 140 which, in turn, divides into information arm 142 and bias arm 144. Arms 142 and 144 join to feed light to branch 146. In similar fashion, second optical input 138 serves as an input to input line 148 which, in turn, divides into information arm 150 and bias arm 152. Likewise, arms 150 and 152 join to form branch 154. Finally, branches 146 and 154 are coupled to mixing links 156a and 156b of a directional coupler 155 whose outputs 48a and 48b serve as head ends for distribution of modulated optical information to two of the plurality of optical fiber links 46, as illustrated in FIG. 2. The degree of mixing in links 156a and 156b is controlled by a pair of electrodes 159 and 161 (as illustrated in FIG. 5), which receives a voltage to generate a field 163, the strength of which regulates the amount of mixing in the coupler. Electrodes 159 and 161 form a coplanar electrode pair, unlike the other vertical electrode pairs in the inventive modulator 100.

Accordingly, as can be seen from the above, the inventive integrated optical modulator comprises, in part, two-armed Mach-Zehnder interferometric modulators in which the index of refraction of a portion of each of the four arms may be varied by applying an appropriate voltage between its respective base and upper electrodes in order to effectively vary the optical path length between the input line with the two arms and the junction of the two arms with the output branches.

In accordance with the present invention, first and second optical inputs 136 and 138 are driven by laser light waves 158 and 160, respectively. Optical linkage providing the laser light waves 158 and 160 to the inputs to integrated-optical sub-unit 100 can be made via a short length of singlemode optical fiber, a lens in free-space, a GRIN lens, a polarization maintaining singlemode optical fiber, or other means. It is only necessary that as much light as possible be made to enter the waveguides and that fluctuations in the input polarizations, which are generally caused by relative motions of optical system elements be minimized.

During operation, an electrical signal comprising the sum of video and audio carriers ranging from 50 Mhz to 300 Mhz or higher and carrying video signals having a bandwidth on the order of 6.00 Mhz and of conventional format, is applied to electrodes 128 and 134. This results in modulating the phase of the light in branches 142 and 150, respectively. At the same time, a DC bias is applied to terminal $V_a$ while another DC bias is applied to terminal $V_c$ in order to vary the relative phase between the two arms of the two Mach-Zehnder interferometric modulators 164 and 166, respectively. In addition, electrodes 108, 110, 112 and 114 are grounded thus forming an electric field between respective pairs of electrodes 108 and 128, 110 and 130, 112 and 132, and 114 and 134. This electric field, as noted above, varies the index of refraction of that portion of the arm lying between the facing electrodes, thus effectively varying the optical path length and, accordingly, the degree to which there is constructive or destructive interference at the output junctions 170 and 172 of modulators 164 and 166.

To understand how this can be achieved, let us consider the general case for a Mach-Zehnder modulator. In particular, let us write the expression for the phase modulated sinusoidal coherent light signal passing through information arm 142 as:

$$(E/2) e^{j(wt+\phi)} \quad (1)$$

where E is the input electric field strength of a coherent light beam input into the modulator, one-half of which is passed to each of its two arms, w is the frequency of the light in radians per second, t is time, $\phi$ is phase modulation information, and j is the square root of minus one.

Likewise, let us consider the unmodulated component passing through the bias arm as:

$$(E/2) e^{jwt}, \quad (2)$$

assuming that no bias voltage is applied.

The electric field at the output junction would then take the form of the sum of the modulated and unmodulated components, which would reduce to:

$$(E/2) e^{jwt}(1+e^{j\phi}) \quad (3)$$

In the case of a television, $\phi$ is proportional to the voltage representing the sum of all the carriers (typically in the range of 50-500 Mhz) with their modulation components and would vary as a function of time, to convey conventional television information. Insofar as light intensity is equal to the electric field strength multiplied by its complex conjugate the output at junction 170 can be given by the expression:

$$I_o = (E/2) e^{jwt}(1+e^{j\phi}) (E/2) e^{-jwt}(130 e^{-j\phi}), \quad (4)$$

where $I_o$ is output light intensity.

By algebraic manipulation, this equation can be reduced to the following form:

$$(E^2/4) (2+(e^{j\phi}+e^{-j\phi})), \quad (5)$$

or, substituting terms in trigonometric form:

$$(E^2/4) (2+(\cos \phi + j \sin \phi)+(\cos \phi - j \sin \phi)) \quad (6)$$

Because the imaginary terms sum to zero, we are left with all real terms:

$$I_o = (E^2/2) (1+\cos \phi), \quad (7)$$

or in terms of the transfer function of the device, $$I_o/I_i = \tfrac{1}{2}(1+\cos \phi), \quad (8)$$

where $I_i$ is the input light intensity into the Mach-Zehnder interferometric modulator. If we consider the transfer function of such a device, it can be demonstrated that severe sinusoidal non-linearities exist in the modulated signal.

However, a simplified situation occurs when one arm of the Mach-Zehnder interferometric modulator (i.e., arm 144 of modulator 164 is given a d.c. bias voltage via electrodes 110 and 130 which, when zero modulation voltage is applied to electrodes 108 and 128, results in a phase difference between the outputs at junction 170 of arms 142 and 144 of $\pm 90°$, or positive or negative odd multiples thereof.

In accordance with the preferred embodiment, arm 144 is given a d.c. bias which results in a $-90°$ phase difference between the coherent light in arm 144 and the coherent light in arm 142, when no modulation is applied. Thus, if E is the electric field intensity of laser light wave 158, $$(E/2) e^{j(wt-90°)}+(E/2) e^{j(wt+\phi)} \quad (9)$$

is the value of the electric field (the sum of the electric field of the light in the d.c. biased arm and the electric field in the arm whose light intensity is modulated by $\phi$ through the use of an information bearing voltage $V_b$ at the junction 170 of arms 142 and 144.

Simplifying terms, this equals:

$$(E/2) e^{(jwt-90°)}(1+e^{j(\phi+90°)}). \quad (10)$$

Multiplying by the complex conjugate, we obtain:

$$I_o = (E^2/2) (1+\cos(\phi+90°)), \quad (11)$$

$$\text{or } I_o = (E^2/2) (1-\sin \phi). \quad (12)$$

Solving for the transfer function, we obtain:

$$I_o/I_i = \tfrac{1}{2}(1-\sin \phi) \quad (13)$$

Similarly, for modulator 166, in accordance with the present invention, we apply a d.c. bias voltage to electrodes 112 and 132 to cause a phase shift between arm 152 and 150 which is $+90°$, when no modulation is applied so that for modulator 166, the electric field at junction 172 may be expressed as:

$$(E'/2) e^{j(w't+90°)}+(E'/2) e^{j(w't+\phi')}, \quad (14)$$

where w' is the angular frequency of laser light 160. Simplifying this reduces to:

$$(E'/2) e^{j(w't+90°)}(1+e^{j(\phi'-90°)}), \quad (15)$$

where E' is the electric field intensity of light wave 160, and $\phi'$, is the scaled amplitude modulation information applied to electrodes 114 and 134, achieved by applying voltage $V_d$ to electrode 114 and 134. Multiplying by the complex conjugate, we obtain the intensity output to junction 172 as:

$$I_o' = (E'^2/4)(1+e^{j(\phi'-90°)})(1+e^{-j(\phi'-90°)}), \quad (16)$$

which reduces to:

$$(E'^2/2)(1+\cos(\phi'-90°)). \quad (17)$$

Converting to the sine function, we obtain:

$$(E'^2/2)(1+\sin \phi'), \quad (18)$$

which yields the transfer function as:

$$I_o'/I_i' = \tfrac{1}{2}(1+\sin \phi') \quad (19)$$

The output at junction 170 (Equation 13), and the output at junction 172 (Equation 19), add at junction 162 to exit through output ends 48a and 48b. It is noted that optical phase shifts can be designed into the modulators by elongating or shortening individual arms, thus eliminating the need for d.c. electrical bias of one arm of each modulator. Any equivalent combination of electrical and physical path length bias can be used, as well.

To understand the presence of various order distortion products, we assume the television signal varies about $\phi=0$ and note that for $|\theta|<1$, $\sin \theta$ can be expressed by the Taylor series, i.e., $$\sin \theta = \theta - \theta^3/3! + \theta^5/5! - \theta^7/7! \ldots \quad (20)$$

If we take the values for output intensity from equations 12 and 18, which have only sine and, more importantly, opposite sign sine components, and add the two output intensities for the two Mach-Zehnder modulators with d.c. phase biases of plus and minus 90°, we obtain the output of the inventive modulator illustrated in FIG. 3 as:

$$(E^2/2)(1-\sin \phi)+(E'^2/2)(1+\sin \phi'). \quad (21)$$

Consolidating terms, we obtain:

$$\tfrac{1}{2}(I_i+I'_i-I_i \sin \phi + I'_i \sin \phi'). \quad (22)$$

Substituting the Taylor Series for equation 20, we obtain the time-varying output of the inventive modulator at head ends 48a and 48b as:

$$(I_i/2)(-\phi+\phi^3/3!-\phi^5/5!+\phi^7/7!\ldots) + ((I'_i/2)(\phi'-\phi'^3/3!+\phi'^5/5!-\phi'^7/7!\ldots) \quad (23)$$

Thus, to get the third order term to cancel out, we would like:

$$\phi' = \phi \left(\sqrt[3]{I_i/I'_i}\right), \quad (24)$$

leaving only fifth order and smaller distortion products in addition to the linear term. This is achieved by setting the intensity of light waves 158 and 160 at the desired $I_i$ and $I_i'$ in a conventional manner, and the magnitude of the television signal voltages and $V_d$ applied to electrode pairs 108, 128 and 114, 134 in the ratio of Equation 24. Bias, modulation, scaling, and the like are achieved in a conventional manner by using electronic control circuitry of the feedback type.

More particularly, by monitoring second order distortion components, a feedback signal can be generated which can be used to control the electrode pairs associated with the bias arms of the individual Mach-Zehnder modulators. Similarly, by monitoring third order distortion products, a feedback signal may be generated to control the electrode pairs associated with the directional coupler and/or the laser intensity ratio $\alpha$, as defined below.

It is also possible to provide for the minimization of second through fourth order distortion products while the inventive modulator is being operated by adding a first low frequency signal (for example 50 KHz) to $V_b$ and adding a different low frequency signal (for example 52 KHz) to $V_d$ to generate distortion products at known points in the frequency spectrum, which are at the same time suitable for feedback control of the inventive system, low enough in frequency as not to affect the operation of the cable system and are sufficiently removed in frequency from the information signals in the system as to permit measurement substantially without interference.

Because of the characteristics of directional coupler 155, which is of a conventional nature, there are two optical outputs 48a and 48b. Output 48a gives the conventional intensity output:

$$\tfrac{1}{2}(1+K\phi), \quad (25)$$

where:

$$K=(\alpha^{170}-1)/(\alpha+1), \quad (26)$$

and $$\alpha = I_i/I'_i \quad (27)$$

If fifty percent crossover between mixing links 156a and 156b is achieved in the device the intensity of the other output 48b will be equal to that of output 48a.

In such a case, this second output is useful to supply a second neighborhood distribution hub. The d.c. electrode pair 159, 161, if needed, ensures that there will be equal mixing of the two light signals, so as to ensure that this combining is accurately described by Equation 23.

Since the first harmonic distortion product is fifth-order, it can be shown that the signal-to-distortion and signal-to-noise ratios are maximized when the quantity $K\alpha^{1/6}$ is maximal, which occurs at an $\alpha$ value of approximately 18 though a range of $12<\alpha<27$ is useful, with 16–20 preferred.

It is important to note that if the wavelengths of the two laser light sources 158 and 160 were to be identical (such that w=w', since wavelength is $2\pi c/w$, where c is the speed of light), then there would be detrimental interference terms generated in directional coupler 155. It is therefore important that there be a wavelength difference between the two sources. In a straightforward derivation, it can be shown that the intensities of each of these interference terms will be modulated by a factor of either $\sin \Delta t$ or $\cos \Delta t$, where t is time and $\Delta$ is equal to $w-w'$. It is easy to ensure that the frequency $\Delta/2\pi$ is much greater than the bandwidth of the photodetection system. This, in turn, ensures that the photodetector will integrate those sinusoidal terms over many sine wave periods, thus averaging the received optical power to zero for each of the potential detrimental terms.

The condition of having $\Delta/2\pi$ much greater than detector bandwidth may be satisfied with two laser light sources of wavelength $\lambda$ and $\lambda'$, as follows:

$$\Delta/2\pi = (w-w')/2\pi = c/\lambda - c/\lambda' \qquad (28)$$

If the two wavelengths are nearly equal, then:

$$\Delta/2\pi = c\,(1/\lambda - 1/\lambda') = (c/\lambda)\,((\lambda'-\lambda)/\lambda) \qquad (29)$$

For laser light at 1300nm, $c/\lambda$ is approximately $2\times10^{14}$ Hz. On the other hand, the detector bandwidth in a cable television system, for example, is no greater than 1GHz ($1\times10^9$ Hz). Thus, a fractional wavelength $(\lambda'-\lambda)/\lambda$ of magnitude greater than merely $5\times10^{-6}$ (5 parts per million) will ensure the cancellation of the potentially detrimental interference terms. The wavelength of a laser source can be adjusted by thermal means, as needed.

It is noted that the inventive system may be applied to systems distributing electrical input signals of high bandwidth, i.e., greater than 2 GHz as in radar applications, through the fabrication of the inventive modulator 100 using travelling-wave electrode structures In such high bandwidth applications, the minimum fractional wavelength difference of the two lasers needs to be larger (in proportion to the bandwidth), but is still reasonable to achieve.

Specifically, the bias and the information electrodes can also be applied in a "push-pull" configuration In that arrangement, each electrode pair is duplicated on the opposing arm of the interferometer structure. That allows 50% lower drive voltages to be applied, but with opposite polarity on the two arms.

It is also noted that in the case of a lithium niobate device, coplanar electrode pairs may be constructed such that the electrical fields in the active region of the phase modulating arms are directed vertically or horizontally, as appropriate for the choice of crystal cut.

In order to ensure the cancellation of the third-order distortions that result from the sum in equation (23), the light waves carrying the two information signals $\phi$ and $\phi'$ must be synchronous when they combine at the directional coupler 155. Any physical asymmetries in the integrated-optic device 100 leading to differences in the effective optical paths for the two light waves will have the effect of making these information signals asynchronous. This effect can be corrected for in a straightforward manner, however, by adding controllable electrical delays to the electrical circuitry that supplies the information voltage signals $V_b$ and $V_d$.

While an illustrative embodiment of the invention has been described above, it is, of course, understood that various modifications will be apparent to those of ordinary skill in the art. Such modifications are within the spirit and scope of the invention, which is limited and defined only by the appended claims.

We claim:

1. In an optical cable television distribution system having a light source means operative to generate an optical carrier signal for information to be transmitted over said system and having an electrical driver means for providing an electrical signal defining information to be transmitted over said cable system, the combination comprising:
   (a) a first modulator optically coupled to said light source means and having an output port for light therefrom modulated in accordance with said electrical signal and having the characteristic of substantially eliminating even order distortion products, said first modulator having a characteristic that third order intermodulation distortion products are of a first sign;
   (b) first coupling means for coupling said electrical signal to said first modulator;
   (c) a second modulator optically coupled to said light source means and having an output port for light therefrom modulated in accordance with said electrical signal and having the characteristic of substantially eliminating even order distortion products, said second modulator having a characteristic that third order intermodulation distortion products are of a sign opposite to said first sign;
   (d) second coupling means for coupling said electrical signal to said second modulator; and
   (e) an optical adder to receive the outputs of said first and second modulators and producing at its output a modulated light signal characteristic of the combination of the outputs from said first and second modulators.

2. A cable television distribution system as in claim 1 wherein said light source means comprises two laser light sources with operating wavelengths offset from each other, one of said light sources being coupled to each of said modulators.

3. A system as in claim 2 wherein said first and second coupling means couple said light from said light source means to said first and second modulators with intensities of $I_i$ and $I_i$, respectively and wherein said electrical signals modulate light passing through said first and second modulators with phase modulations of $\phi$ and $\phi'$, respectively, in accordance with the relationship:

$$\phi' = \phi \left( \sqrt[3]{I_i/I_{i'}} \right),$$

4. A system as in claim 3 wherein the ratio $\alpha$ of $I'_i$ to $I_i$ is in the range of 12 to 27.

5. A system as in claim 4 wherein the ratio $\alpha$ is approximately 18.

6. A system as in claim 2 wherein said adder is a directional coupler.

7. A system as in claim 6 further comprising a pair of electrodes to control the degree of mixing in said directional coupler.

8. A system as in claim 2 wherein said first and second modulators are modulators of the Mach-Zehnder type and said first modulator has an arm whose output at a first combiner is shifted by 90° with respect to an information arm of said first modulator and said second modulator as an arm whose output has shifted −90° with respect to the unmodulated output of an information of second modulator.

9. A system as in claim 8 wherein said shift of ±90° is constrained by the path length difference between the two arms in the first and second modulators.

10. A cable television distribution system as in claim 1 wherein said first modulator comprises:

(i) a first input optical path;
(j) first means for dividing said first input optical path into first and second paths;
(k) a first modulation arm coupled to said first path;
(l) a first bias arm coupled to said second path, the phase difference between the light in said first path and the light in said second path being plus ninety degrees, when the value of said electrical signal is zero;
(m) a first electrode coupled to said first coupling means for receiving the information contained in said electrical signal and phase modulating the portion of the light passing through said first path;
(n) a first optical combiner for combining the output of said bias arm and said modulation arm; and wherein said second modulator comprises:
(o) a second input optical path;
(p) second means for dividing said second input optical path into third and fourth paths;
(q) a second modulation arm coupled to said third path;
(r) a second bias arm coupled to said fourth path, the phase difference between the light in said third path and the light in said fourth path being minus ninety degrees, when the value of said electrical signal is zero;
(s) a second electrode coupled to said second coupling means for receiving the information contained in said electrical signal and phase modulating the portion of the light passing through said third path; and
(t) a second optical combiner for combining the output of said bias arm and said modulation arm.

11. A cable television distribution system as in claim 10 wherein said light source means comprises two laser light sources with operating wavelengths offset from each other, one of said light sources being coupled to each of said modulators.

12. A system as in claim 10 further comprising means to measure the second order distortion products in order to control the phase in said bias arm.

13. In a device for modulating the output of light source means in accordance with an electrical signal containing information to be transmitted, the combination comprising:
(a) a first modulator coupled to receive light from said light source means, said first modulator having an output port for modulated light and having the characteristic of substantially eliminating even order distortion products, said first modulator having a characteristic that third order intermodulation distortion products are of a first sign;
(b) first coupling means for coupling said electrical signal to said first modulator;
(c) a second modulator coupled to receive light from said light source means, said second modulator having an output port for modulated light and having the characteristic of substantially eliminating even order distortion products, said second modulator having a characteristic that third order intermodulation distortion products are of a sign opposite to said first sign;
(d) second coupling means for coupling said electrical signal to said second modulator; and
(e) an adder optical coupled to receive the output of said first and second modulators and producing at its output a modulated output light signal characteristic of the output of said first and second modulators.

* * * * *